(12) United States Patent
Atarashi et al.

(10) Patent No.: US 8,035,266 B2
(45) Date of Patent: Oct. 11, 2011

(54) AXIAL GAP MOTOR

(75) Inventors: Hirofumi Atarashi, Shioya-gun (JP); Shoei Abe, Kawachi-gun (JP); Keiichi Yamamoto, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/596,289

(22) PCT Filed: Feb. 25, 2008

(86) PCT No.: PCT/JP2008/053178
§ 371 (c)(1),
(2), (4) Date: Oct. 16, 2009

(87) PCT Pub. No.: WO2008/129902
PCT Pub. Date: Oct. 30, 2008

(65) Prior Publication Data
US 2010/0117474 A1  May 13, 2010

(30) Foreign Application Priority Data
Apr. 17, 2007 (JP) .................................. 2007-108127

(51) Int. Cl.
*H02K 1/27* (2006.01)
*H02K 21/24* (2006.01)
(52) U.S. Cl. .......... 310/156.43; 310/156.44; 310/156.45
(58) Field of Classification Search ............. 310/156.35, 310/156.38, 156.41, 156.43–156.45, 156.48–156.56, 310/216.004, 216.045–216.047, 266–268
See application file for complete search history.

(56) References Cited

U.S. PATENT DOCUMENTS

| 336,087 A | 2/1886 | Brush |
| 2,154,146 A | 4/1939 | Becker |
| 2,632,861 A | 3/1953 | Morton et al. |
| 3,108,200 A | 10/1963 | Baldwin |

(Continued)

FOREIGN PATENT DOCUMENTS

EP  1 612 913 A2  1/2006

(Continued)

OTHER PUBLICATIONS

Zhu Z Q et al: "Influence of Design Parameters on Cogging Torque in Permanent Magnet Machines" IEEE Transactions on Energy Conversion, IEEE Service Center, Piscataway, NJ, US, vol. 15, No. 4, Dec. 1, 2000, XP011015601 ISSN: 0885-8969, p. 411.

(Continued)

*Primary Examiner* — Tran Nguyen
(74) *Attorney, Agent, or Firm* — Arent Fox, LLP

(57) ABSTRACT

An axial gap motor includes: a rotor; and a stator, wherein: the rotor includes a plurality of main permanent magnet parts and a plurality of auxiliary permanent magnet parts, the auxiliary permanent magnet parts being disposed near an end portion of each of the main permanent magnet parts and a magnetizing direction of each of the auxiliary permanent magnet parts corresponding to a direction perpendicular to the direction of the rotational axis; each of the stators includes a plurality of teeth arranged in a circumferential direction and protruding toward the rotor along the rotational axis, and a circumferential distance between a circumferential direction first end and a circumferential direction second end of each of the auxiliary permanent magnet parts on a surface opposite the stator is larger than a slot width of a slot defined between the teeth adjacent in the circumferential direction.

5 Claims, 11 Drawing Sheets

U.S. PATENT DOCUMENTS

| | | |
|---|---|---|
| 3,465,188 A | 9/1969 | Sisk |
| 3,591,819 A | 7/1971 | Laing |
| 3,762,042 A | 10/1973 | Abe et al. |
| 3,956,651 A | 5/1976 | Brammerlo |
| 4,007,387 A | 2/1977 | Rustecki |
| 4,095,150 A | 6/1978 | Senckel |
| 4,363,988 A | 12/1982 | Kliman |
| 4,410,820 A | 10/1983 | Stanley |
| 4,864,175 A | 9/1989 | Rossi |
| 4,996,457 A | 2/1991 | Hawsey et al. |
| 5,142,179 A | 8/1992 | Nakamura et al. |
| 5,245,238 A | 9/1993 | Lynch et al. |
| 5,334,899 A | 8/1994 | Skybyk |
| 5,387,854 A | 2/1995 | McCleer et al. |
| 5,394,321 A | 2/1995 | McCleer et al. |
| 5,397,953 A | 3/1995 | Cho |
| 5,642,009 A | 6/1997 | McCleer et al. |
| 5,671,524 A | 9/1997 | Damsky et al. |
| 5,731,649 A | 3/1998 | Caamaño |
| 5,757,108 A | 5/1998 | Suzuki |
| 5,907,210 A | 5/1999 | Chaix |
| 5,925,965 A | 7/1999 | Li et al. |
| 5,955,809 A * | 9/1999 | Shah .......................... 310/198 |
| 6,034,459 A | 3/2000 | Matsunobu et al. |
| 6,373,162 B1 | 4/2002 | Liang et al. |
| 6,739,034 B2 | 5/2004 | Suzuki et al. |
| 6,809,453 B2 | 10/2004 | Narita et al. |
| 6,919,663 B2 | 7/2005 | Iles-Klumpner |
| 6,960,860 B1 | 11/2005 | DeCristofaro et al. |
| 6,995,494 B2 | 2/2006 | Haugan et al. |
| 7,144,468 B2 | 12/2006 | Decristofaro et al. |
| 7,230,359 B2 | 6/2007 | Iles-Klumpner |
| 7,230,361 B2 | 6/2007 | Hirzel |
| 7,315,102 B2 | 1/2008 | Minagawa |
| 7,355,311 B2 | 4/2008 | Shimizu |
| 7,679,260 B2 * | 3/2010 | Yamamoto et al. ........... 310/268 |
| 7,737,594 B2 * | 6/2010 | Abe et al. ................. 310/156.53 |
| 2004/0070307 A1 | 4/2004 | Haugan et al. |
| 2005/0194855 A1 | 9/2005 | Hasebe et al. |
| 2005/0285467 A1 | 12/2005 | Shimizu |
| 2006/0028093 A1 | 2/2006 | Minagawa et al. |
| 2006/0238056 A1 | 10/2006 | Alvarez et al. |
| 2006/0273676 A1 | 12/2006 | Naruse et al. |
| 2006/0284507 A1 | 12/2006 | Murakami |
| 2007/0018520 A1 | 1/2007 | Kaneko et al. |
| 2007/0080598 A1 | 4/2007 | Naruse |
| 2007/0170802 A1 | 7/2007 | Potoradi |
| 2009/0243422 A1* | 10/2009 | Atarashi et al. ........ 310/216.074 |
| 2009/0251021 A1* | 10/2009 | Atarashi et al. .......... 310/156.07 |
| 2009/0295245 A1* | 12/2009 | Abe et al. ................. 310/156.35 |
| 2009/0295246 A1* | 12/2009 | Abe ........................ 310/156.35 |
| 2010/0090555 A1* | 4/2010 | Tajima et al. ............ 310/156.35 |
| 2010/0141075 A1* | 6/2010 | Atarashi et al. .......... 310/156.35 |
| 2010/0187933 A1* | 7/2010 | Yamamoto et al. ...... 310/156.29 |
| 2010/0219710 A1* | 9/2010 | Kawamura et al. ...... 310/156.12 |
| 2010/0231079 A1* | 9/2010 | Abe et al. ................. 310/156.35 |

FOREIGN PATENT DOCUMENTS

| | | |
|---|---|---|
| EP | 1 850 451 A1 | 10/2007 |
| JP | 55-53161 | 4/1980 |
| JP | 55-053161 A | 4/1980 |
| JP | 59-144352 A | 8/1984 |
| JP | 59-230453 A | 12/1984 |
| JP | 02-079174 A | 3/1990 |
| JP | 02-079174 U | 6/1990 |
| JP | 6-500457 A | 1/1994 |
| JP | 6-205554 A | 7/1994 |
| JP | 9-168263 A | 6/1997 |
| JP | 10-164779 A | 6/1998 |
| JP | 10-271784 A | 10/1998 |
| JP | 3-062085 U | 9/1999 |
| JP | 3062085 U | 9/1999 |
| JP | 11-299199 A | 10/1999 |
| JP | 11-511948 A | 10/1999 |
| JP | 2000-197301 A | 7/2000 |
| JP | 2000-262026 A | 9/2000 |
| JP | 2001-057753 A | 2/2001 |
| JP | 2001-136721 A | 5/2001 |
| JP | 2001-251817 A | 9/2001 |
| JP | 2002-112481 A | 4/2002 |
| JP | 2005-094955 A | 4/2005 |
| JP | 2005-143288 A | 6/2005 |
| JP | 2005-269778 A | 9/2005 |
| JP | 2005-304245 A | 10/2005 |
| JP | 2005-318782 A | 11/2005 |
| JP | 2005 341696 A | 12/2005 |
| JP | 2006-025482 A | 1/2006 |
| JP | 2006-166635 A | 6/2006 |
| JP | 2006-222131 A | 8/2006 |
| JP | 2006-527578 A | 11/2006 |
| JP | 2006-345627 A | 12/2006 |
| JP | 2007-028868 A | 2/2007 |
| JP | 2007-037210 A | 2/2007 |
| JP | 2007-053844 A | 3/2007 |
| JP | 2007-089270 A | 4/2007 |
| JP | 2007-104819 A | 4/2007 |
| JP | 2007-151321 A | 6/2007 |
| JP | 2007-215291 A | 8/2007 |
| JP | 2008-022663 A | 1/2008 |
| JP | 2008-048497 A | 2/2008 |
| JP | 2008-104278 A | 5/2008 |
| WO | WO 92/20131 A2 | 11/1992 |
| WO | WO 96/29774 A1 | 9/1996 |
| WO | WO 2004/109894 A1 | 12/2004 |
| WO | WO 2006/077812 A1 | 7/2006 |
| WO | WO 2007/091727 A1 | 8/2007 |

OTHER PUBLICATIONS

United States Official Office Action dated Mar. 29, 2011, issued in U.S. Appl. No. 12/457,106, 17 pages total.

United States Official Office Action dated Apr. 11, 2011, issued in U.S. Appl. No. 12/670,601, 12 pages total.

* cited by examiner

AXIAL GAP MOTOR

CROSS-REFERENCE TO RELATED APPLICATION

This is a National Stage entry of International Application No. PCT/JP2008/053178, filed Feb. 25, 2008 which claims priority to Japanese Application Number 2007-108127, filed Apr. 17, 2007, the disclosure of the prior application is hereby incorporated herein in its entirety by reference.

BACKGROUND OF THE INVENTION

1. Field of the Invention

The present invention relates to an axial gap motor. This application claims priority of Japanese Patent Application No. 2007-108127 filed Apr. 17, 2007, the contents of which are incorporated herein by reference in their entirety.

2. Background Art

A related art axial gap type permanent magnet synchronizer includes a rotor and a pair of stators. The stators oppose each other with the rotor disposed therebetween along a rotational axis. A magnetic flux loop is formed via the pair of stators against a field magnetic flux generated by a permanent magnet part of the rotor (see, for example, Japanese Unexamined Patent Application, First Publication (JP-A) Nos. 10-271784 and 2001-136721).

It is desirable to control the generation of cogging torque and torque ripple caused by magnetic attractive force along the rotational direction in the related art permanent magnet synchronizer.

SUMMARY OF THE INVENTION

In view of these circumstances, an object of the present invention is to provide an axial gap motor that may control the generation of cogging torque and torque ripple.

(1) In order to solve the above-described problems, an aspect of the present invention is an axial gap motor which includes: a rotor which is rotatable about a rotational axis; and a stator disposed at least at one side of the rotor along the rotational axis, wherein: the rotor includes a plurality of main permanent magnet parts and a plurality of auxiliary permanent magnet parts, the main permanent magnet parts being arranged on the rotor along a circumferential direction, a magnetizing direction of each of the main permanent magnet parts corresponding to the direction of the rotational axis, the auxiliary permanent magnet parts being disposed near an end portion of each of the main permanent magnet parts, and a magnetizing direction of each of the auxiliary permanent magnet parts corresponding to a direction perpendicular to the direction of the rotational axis; each of the stators includes a plurality of teeth arranged in a circumferential direction and protruding toward the rotor along the rotational axis; and a circumferential distance between a circumferential direction first end and a circumferential direction second end of each of the auxiliary permanent magnet parts on a surface opposite the stator is larger than a slot width of a slot defined between the teeth adjacent in the circumferential direction.

(2) In the axial gap motor, a circumferential width of the surface opposite the stator may be larger than the slot width.

(3) In the axial gap motor, a longitudinal axis of each of the auxiliary permanent magnet parts when seen in plan view along the rotational axis may be orthogonal to a longitudinal axis of the slot defined between the teeth adjacent in the circumferential direction.

(4) In the axial gap motor, each of the auxiliary permanent magnet parts may include a pair of a first auxiliary permanent magnet part and a second auxiliary permanent magnet part disposed near both ends of each of the main permanent magnet parts along the rotational axis; and the stator may include first and second stators which oppose each other along the rotational axis with the rotor disposed therebetween.

(5) In the axial gap motor, each of the main permanent magnet parts or each of the auxiliary permanent magnet parts may have a cross-section along the radial direction of the rotor which increases from an outer end toward an inner end along the radial direction.

According to aspect (1) of the present invention, a circumferential width between a first end (i.e., a circumferential direction first end) and a second end (i.e., a circumferential direction second end) on a surface opposite the stator is larger than a slot width of a slot defined between the teeth adjacent in the circumferential direction, and thus the first and the second ends may overlap different teeth along the rotational axis. Accordingly, the circumferential direction first and second ends of each of the auxiliary permanent magnet parts receive a magnetic attractive force that may be mutually canceled in the opposite directions. With this configuration, cogging torque resulting from the total amount of the magnetic attractive force acting on the rotational direction may be reduced. Torque ripple may also be reduced, and therefore the occurrence of back torque in the opposite rotational direction may be controlled.

According to aspect (2) of the present invention, since the circumferential width of the surface opposite the stator is larger than the slot width, overlapping areas of the teeth and the auxiliary permanent magnet parts along the rotational axis may be increased. With this configuration, cogging torque and torque ripple may further be reduced.

According to aspect (3) of the present invention, since the auxiliary permanent magnet parts extend perpendicular to a longitudinal direction of the slot, the auxiliary permanent magnet parts are inclined with respect to the teeth of the stator. With this configuration, cogging torque and torque ripple may further be reduced.

According to aspect (4) of the present invention, a magnetic flux is appropriately converged by an effect of a magnetic flux lens generated by the Halbach array of the permanent magnet parts of the main permanent magnet parts and the auxiliary permanent magnet parts. The field magnetic flux may be swept between a pair of first and second stators along the rotational axis. With this configuration, an amount of the magnetic flux interlinked to a stator winding of each stator may be increased.

According to aspect (5) of the present invention, the rigidity of the rotor may be improved by increasing a radial direction cross-section of each of the main permanent magnet parts and/or each of the auxiliary permanent magnet parts from the outer end toward the inner end along the radial direction. Since a circumferential width between the first and second circumferential ends is larger than the slot width at the radial direction outer side with a relatively smaller cross-section than that of the radial direction of the inner side of each of the main permanent magnet parts and/or each of the auxiliary permanent magnet parts, cogging torque and torque ripple may further be reduced.

DESCRIPTION OF THE PREFERRED EMBODIMENTS

Figure 1:
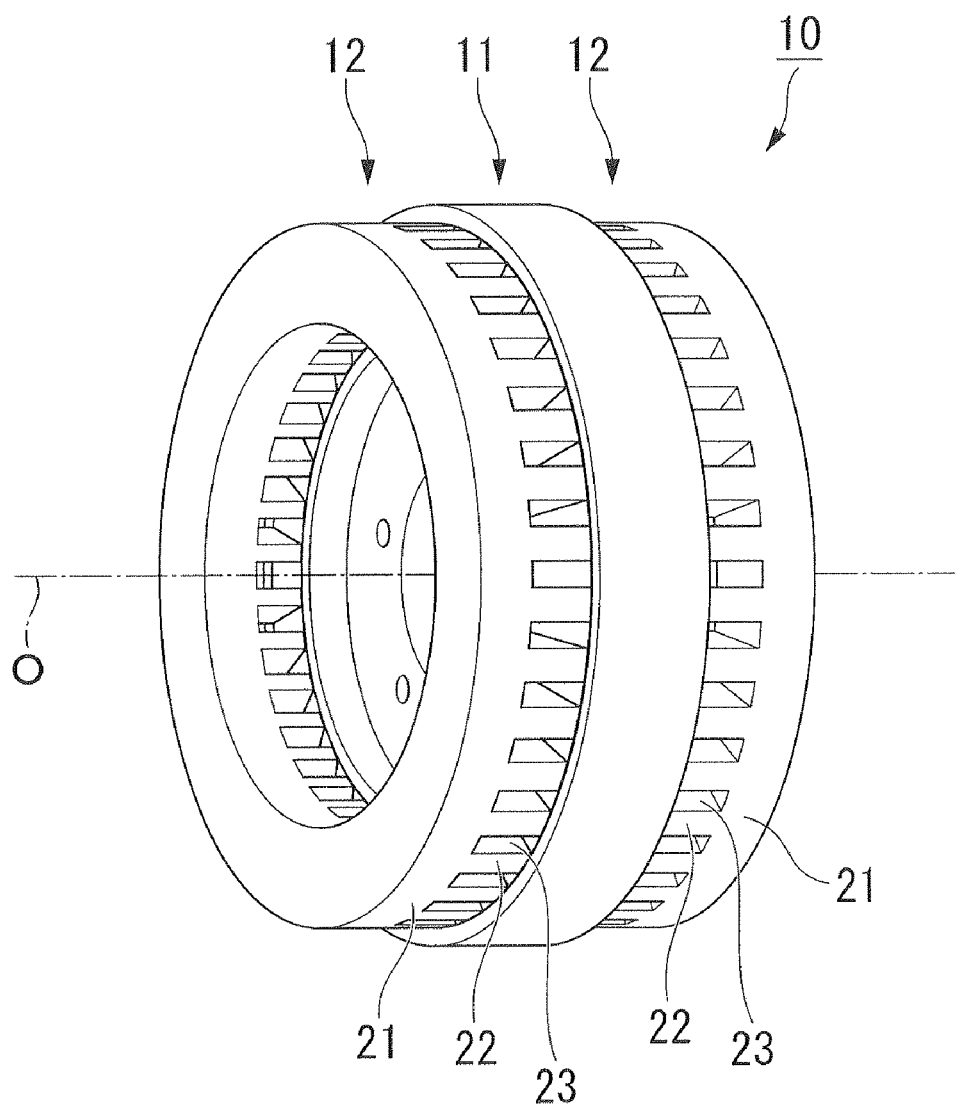
FIG. 1 is a perspective view of an axial gap motor according to an embodiment of the invention.

Referring now to the drawings, an axial gap motor according to an embodiment of the invention will be described.

Figure 2:
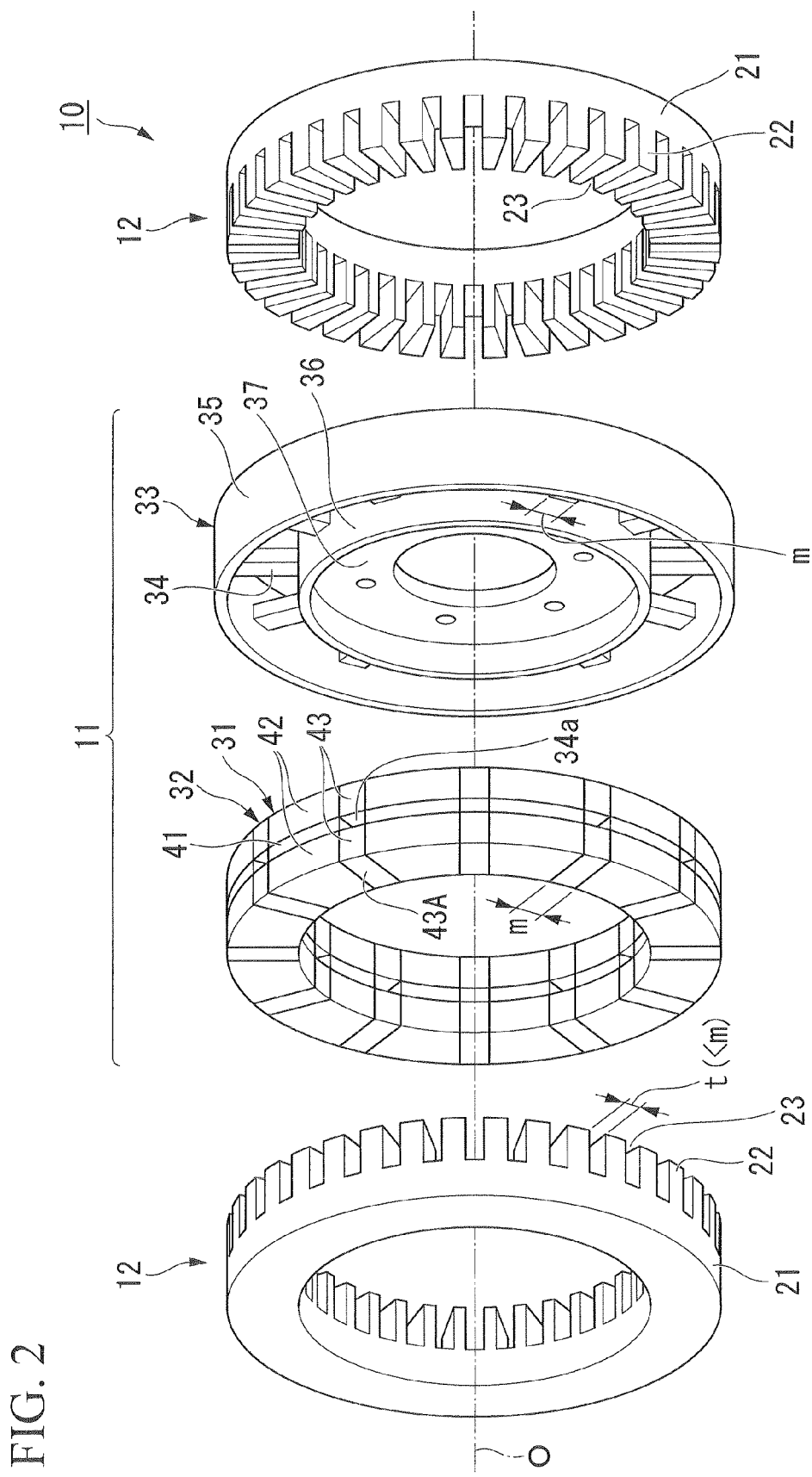
FIG. 2 is an exploded perspective view of a rotor of the axial gap motor.

An axial gap motor 10 includes a substantially annular rotor 10 and a pair of stators 12 as shown in FIGS. 1 and 2. The rotor 11 is provided to rotate about a rotational axis O of the axial gap motor 10. The stators 12 oppose each other with the rotor 11 disposed therebetween along a rotational axis. The stators 12 include a plurality of stator windings which generate a rotating magnetic field to rotate the rotor 11.

The motor 10 is incorporated in a vehicle, such as a hybrid vehicle and an electric vehicle, as a driving source. An output shaft of the motor 10 is connected to an input shaft of a transmission mechanism (not shown) so that the driving force of the motor 10 is transmitted to a driving wheel (not shown) of a vehicle via the transmission mechanism.

Upon receiving the driving force from the driving wheel when the vehicle decelerates, the motor 10 functions as a power generator and generates a regenerative braking force. The motor 10 also collects motion energy of the vehicle body as electrical energy (i.e., regeneration energy). Especially in a hybrid vehicle where the rotational axis of the motor 10 is connected to a crankshaft of an internal-combustion engine (not shown), the motor 10 also functions as a power generator and generates power generation energy upon receiving output of the internal-combustion engine.

Each of the stators 12 includes a yoke 21, which is a substantially annular plate member, a plurality of teeth 22 protruding toward the rotor 11 along the rotational axis O and a stator wiring (not shown). The teeth 22 are provided on a surface of the yoke 21 opposing the rotor 11 and are arranged along the periphery of the yoke 21 at predetermined intervals. The teeth 22 extend in a radial direction of the yoke 21. The stator winding is disposed between the teeth 22.

Each stator 12 may be a 6N-stator having six main poles (e.g., U+, V+, W+, U−, V− and W−). The poles U+, V+ and W+ of one of the stators 12 oppose the poles of U−, V− and W− of the other along the rotational axis O.

In the pair of stators 12 opposing along the rotational axis O, for example, three teeth 22 of a first stator 12 corresponding to the poles U+, V+ and W+ and the three teeth 22 of a second stator 12 corresponding to the poles U−, V− and W− are arranged to oppose each other along the rotational axis O. In this manner, the teeth 22 of the first stator 12 and the teeth 22 of the second stator 12 are provided with current-conducting states having inverse electrical angles.

Figure 3:
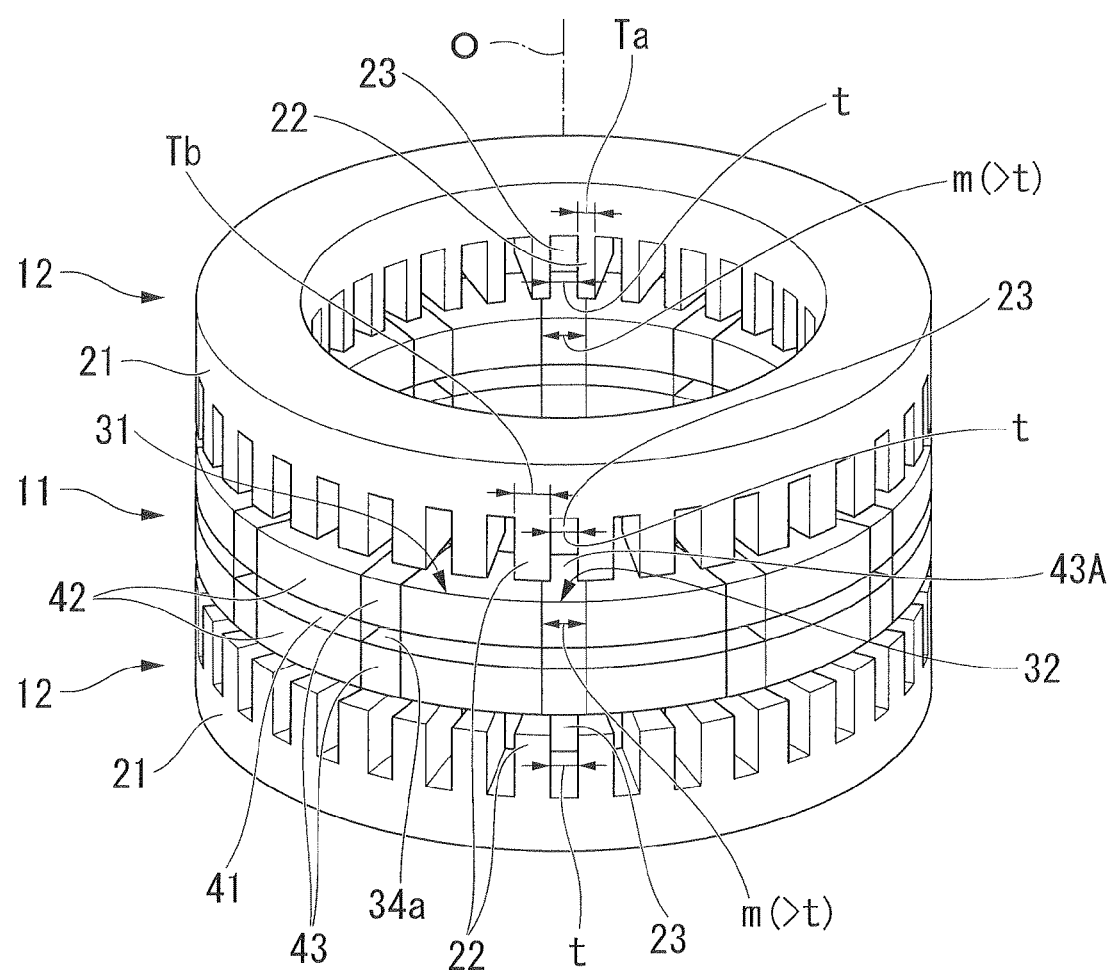
FIG. 3 is a perspective view of a main part of the rotor.

A circumferential width of each of the teeth 22 increases gradually from an inner end toward an outer end along the radial direction such that the outer circumferential width Tb is larger than the inner circumferential width Ta as shown in FIG. 3. With this configuration, the distance between adjacent teeth 22 in the circumferential direction, i.e., a slot width t of a slot 23 defined between adjacent teeth 22 so as to extend in the radial direction, is constant along the radial direction.

As shown in FIG. 2, the rotor 11 includes a plurality of main magnet poles 31, a plurality of auxiliary magnet portions 32 and a non-magnetic rotor frame 33. The main magnet poles 31 and the auxiliary magnet portions 32 are disposed alternately along the circumferential direction of the rotor 11 and are accommodated in the rotor frame 33.

The rotor frame 33 includes an inner circumferential cylindrical member 35, an outer circumferential cylindrical member 36 and a connecting section 37. The cylindrical members 35 and 36 are connected to each other via a plurality of radial ribs 34 disposed at predetermined intervals along the circumferential direction. The connecting section 37 is an annular plate member which protrudes inwardly from an inner circumferential surface of the inner circumferential cylindrical member 35. The connecting section 37 is connected to an external driving shaft (e.g., an input shaft of a vehicle transmission mechanism).

In the present embodiment, since the inner circumferential cylindrical member 35 of the rotor frame 33 is connected to the external driving shaft, each of the radial ribs 34 faces the shaft at a radial direction on an inner side thereof and faces the rim at the radial direction on an outer side thereof The radial rib 34 has a predetermined constant cross-section in the radial direction. A circumferential width of the radial rib 34 is almost equal to a circumferential width m of the auxiliary permanent magnet part 43, which will be described later. The radial rib 34 has a predetermined constant thickness along the rotational axis O in the radial direction.

Figure 4A:
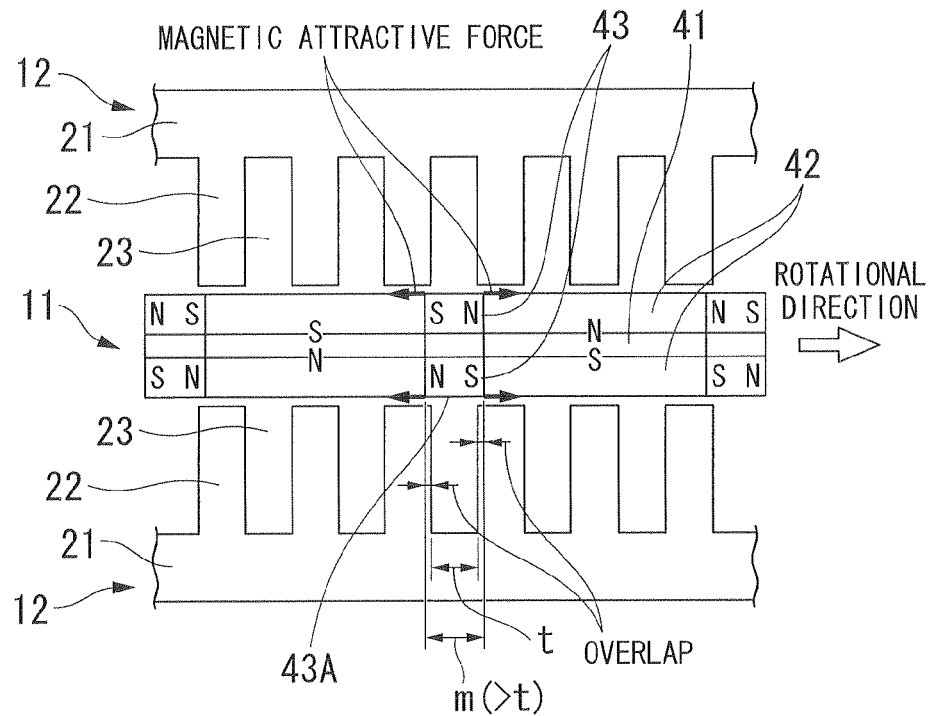
FIG. 4A shows a radial cross-section of a main part of an axial gap motor according to the embodiment of the invention.

Each of the main magnet poles 31 includes a main permanent magnet part 41 and a pair of magnetic materials 42. The main permanent magnet part 41 is a substantially fan-shaped, plate member which is magnetized along the thickness direction (i.e., the direction of the rotational axis O). The magnetic materials 42 are substantially fan-shaped, plate members which oppose each other with the main permanent magnet part 41 disposed therebetween along the thickness direction thereof. As shown in FIG. 4A, adjacent main permanent magnet parts 41 of the main magnet poles 31 arranged in the circumferential direction are magnetized along different directions.

The main magnet poles 31 accommodated in the rotor frame 33 are disposed between the inner circumferential cylindrical member 35 and the outer circumferential cylindrical member 36 in the radial direction, and disposed adjacent to each other via the radial ribs 34 in the circumferential direction.

In the rotor frame 33, each of the main permanent magnet parts 41 is disposed between two radial ribs 34 along the circumferential direction. Each of the main permanent magnet parts 41 has a constant thickness along the rotational axis O in the radial direction as in the radial ribs 34.

Each of the magnetic materials 42 has a constant thickness along the rotational axis O in the radial direction as in the auxiliary permanent magnet part 43, which will be described later.

As shown in FIGS. 2 and 3, each of the auxiliary magnet portions 32 includes a pair of auxiliary permanent magnet parts 43 which oppose each other with the radial rib 34 disposed therebetween along the rotational axis O in the rotor frame 33. As shown in FIG. 4A, adjacent auxiliary permanent magnet parts 43 opposing along the rotational axis O are magnetized along different directions, i.e., the direction of the rotational axis O and a direction perpendicular to the radial direction (i.e., the substantially circumferential direction).

The auxiliary permanent magnet part 43 has a predetermined constant thickness along the rotational axis O in the radial direction as in the magnetic material 42. A circumferential width m of the auxiliary permanent magnet part 43 is almost equal to a circumferential width of the radial rib 34.

In the rotor frame 33, the auxiliary permanent magnet parts 43 of the auxiliary magnet portions 32 adjacent in the circumferential direction oppose each other with the magnetic material 42 of the main magnet pole 31 disposed therebetween along the circumferential direction.

FIG. 2 shows the rotor frame 33 of the rotor 11 and components other than the rotor frame 33 (i.e., the main magnet poles 31 and the auxiliary magnet portions 32) separately. FIG. 3 only shows the components other than the rotor frame 33 (i.e., the main magnet poles 31 and the auxiliary magnet portions 32). As shown in FIGS. 2 and 3, spaces 34a are defined between the pair of auxiliary permanent magnet parts 43 opposing along the rotational axis O and between the main permanent magnet parts 41 adjacent in the circumferential direction. The radial ribs 34 of the rotor frame 33 are disposed in the spaces 34a.

As shown in FIG. 4A, adjacent auxiliary permanent magnet parts 43 opposing in the circumferential direction via the magnetic material 42 are magnetized along different directions.

The magnetic poles of a pair of auxiliary permanent magnet parts 43 disposed at one side along the rotational axis O correspond to one of the magnetic poles of the main permanent magnet part 41 magnetized along the rotational axis O. The magnetic poles of a pair of auxiliary permanent magnet parts 43 disposed at the other side along the rotational axis O correspond to the other of the magnetic poles of the main permanent magnet part 41 magnetized along the rotational axis O.

In particular, if the main permanent magnet part 41 has an N-pole at a first side and an S-pole at a second side along the rotational axis O, the pair of auxiliary permanent magnet parts 43 which oppose each other with the magnetic material 42 disposed therebetween along the circumferential direction at the first side along the rotational axis O is placed so that the N-poles oppose mutually in the circumferential direction; and the pair of auxiliary permanent magnet parts 43 which oppose each other with the magnetic material 42 disposed therebetween along the circumferential direction at the second side along the rotational axis O is placed so that the S-poles oppose mutually in the circumferential direction.

Accordingly, the magnetic flux of the main permanent magnet part 41 and each of the auxiliary permanent magnet parts 43 is converged by an effect of a magnetic flux lens generated by the Halbach array of the permanent magnet parts. The effective magnetic flux interlinked to each stator 12 increases relatively.

In the present embodiment, the circumferential width m of each of the auxiliary permanent magnet parts 43 is larger than the slot width t of the slot 23.

As in the embodiment shown in FIG. 4A, the auxiliary permanent magnet parts 43 may be disposed such that a first end (i.e., a circumferential direction first end) and a second end (i.e., a circumferential direction second end) may overlap different teeth 22 along the rotational axis O. Accordingly, the circumferential direction first and second ends of each of the auxiliary permanent magnet parts 43 receive a magnetic attractive force that may be mutually canceled in the opposite directions. With this configuration, cogging torque resulting from the total amount of the magnetic attractive force acting on the rotational direction may be reduced. Torque ripple may also be reduced and therefore occurrence of back torque in the opposite rotational direction may be controlled.

Figure 4B:
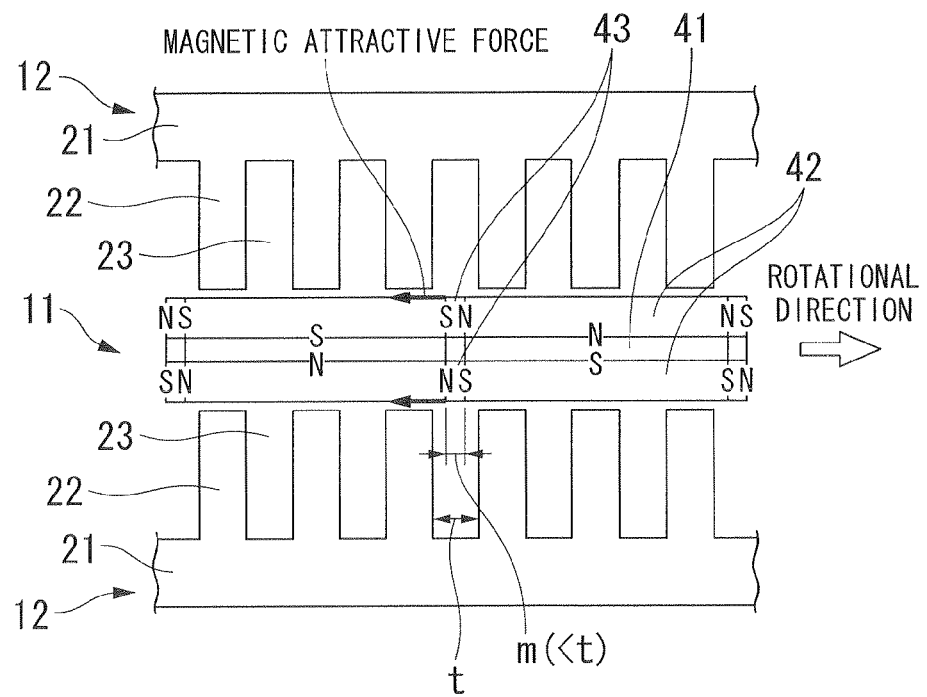
FIG. 4B shows a radial cross-section of a main part of an axial gap motor according to a comparative embodiment of the invention.

If, however, the circumferential width m of the auxiliary permanent magnet part 43 is smaller than the slot width t of the slot 23 as in a comparative embodiment of the invention shown in FIG. 4B, the auxiliary permanent magnet part 43 and the teeth 22 do not overlap each other along the rotational axis O. Alternatively, only one of the circumferential direction first and second ends of the auxiliary permanent magnet part 43 overlaps a single tooth 22 along the rotational axis O. With this configuration, the total amount of the magnetic attractive force acting on the rotational direction increases relatively. Accordingly, cogging torque and torque ripple may disadvantageously increase to cause the back torque generated in opposite rotational direction to increase.

As described above, according to the axial gap motor 10 of the present embodiment, the circumferential width m of each auxiliary permanent magnet part 43 is larger than the slot width t of the slot 23. The auxiliary permanent magnet part 43 has the field magnetic flux which increases relatively as compared to the main permanent magnet part 41 arranged in the Halbach array of the permanent magnet parts in the rotor 11. With this configuration, cogging torque resulting from the total amount of the magnetic attractive force acting on the rotational direction may be reduced. Torque ripple may also be reduced and therefore occurrence of back torque in the opposite rotational direction may be controlled.

Figure 5A:
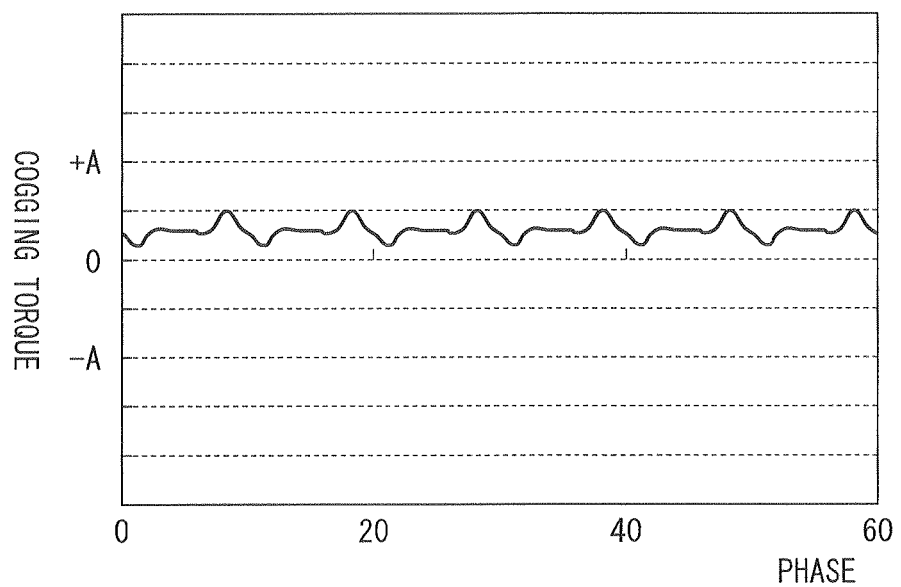
FIG. 5A shows an exemplary cogging torque waveform of an axial gap motor according to an embodiment when no current is applied.
Figure 5B:
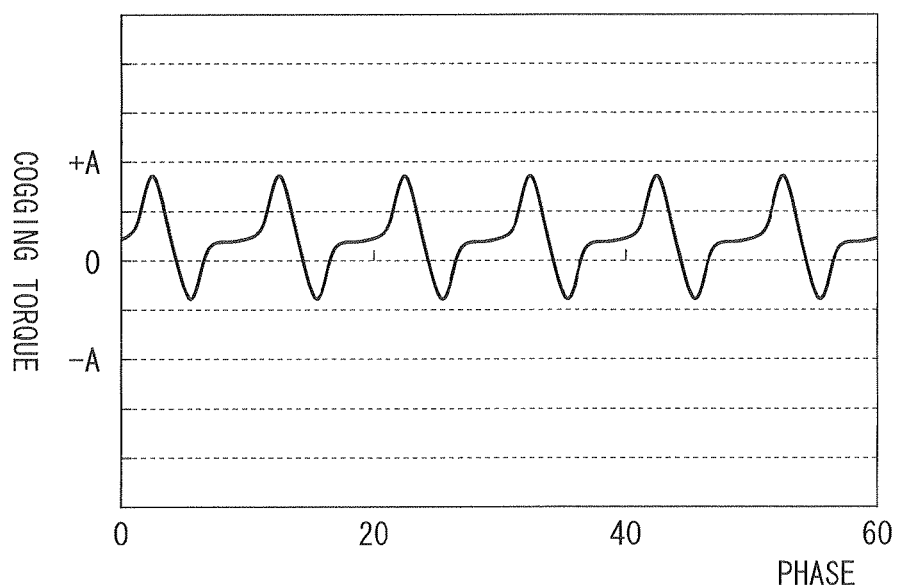
FIG. 5B illustrates a comparative cogging torque waveform of an axial gap motor according to an embodiment when no current is applied.
Figure 6A:
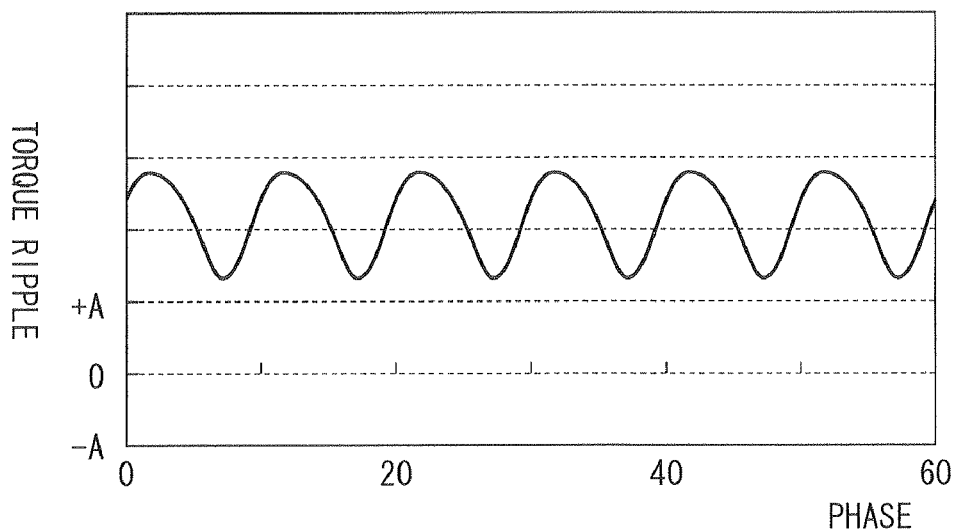
FIG. 6A illustrates an exemplary torque ripple waveform of an axial gap motor according to an embodiment when current is applied.
Figure 6B:
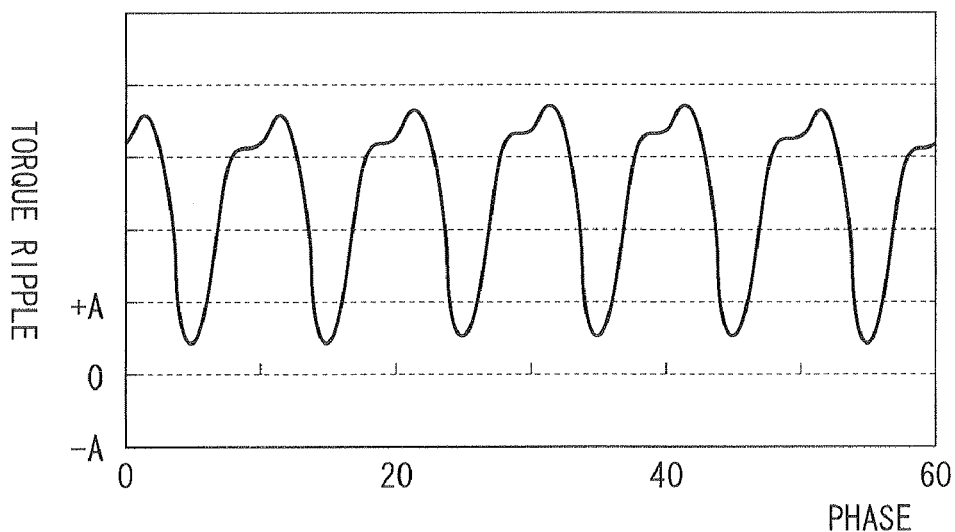
FIG. 6B illustrates a comparative torque ripple waveform of an axial gap motor according to an embodiment when current is applied.

In an embodiment in which the circumferential width m of the auxiliary permanent magnet part 43 is larger than the slot width t of the slot 23, as compared to an embodiment in which the circumferential width m of the auxiliary permanent magnet part 43 is smaller than the slot width t of the slot 23, cogging torque and torque ripple are relatively small when no current is applied to a stator winding of each stator 12 as shown in FIGS. 5A and 5B or when current is applied to a stator winding of each stator 12 as shown in FIGS. 6A and 6B.

Although the circumferential width m of the auxiliary permanent magnet part 43 is larger than the slot width t of the slot 23 in the embodiment described above, the invention is not limited to the same. Alternatively, at least a circumferential width of an opposing surface 43A of the auxiliary permanent magnet part 43 opposite each stator 12 is larger than the slot width t.

Although each of the auxiliary permanent magnet parts 43 has a predetermined constant circumferential width m in the radial direction as in the circumferential width of the radial rib 34 in the embodiment described above, the invention is not limited to the same. In a first modified embodiment shown in FIGS. 7 to 10, each of the auxiliary permanent magnet parts 43 may alternatively have a circumferential width which increases gradually from an outer end toward an inner end along the radial direction such that, e.g., the circumferential width gradually increases from outer circumferential width mb to inner circumferential width ma (>mb).

In the first modified embodiment, it suffices that the outer circumferential width mb (<the inner circumferential width ma) of each of the auxiliary permanent magnet parts 43 be larger than the slot width t of the slot 23.

According to the axial gap motor 10 of the first modified embodiment, the auxiliary permanent magnet part 43 may have a relatively increasing cross-section at the side of the shaft (i.e., the radial direction inner side) and relatively decreasing cross-section at the side of the rim (i.e., the radial direction outer side) in order to prevent occurrence of resonance during rotation of the rotor 11 by improving rigidity of the rotor 11 and increase characteristic frequency of the rotor 11. Even in this case, since at least the outer circumferential width mb (<the inner circumferential width ma) of the auxiliary permanent magnet part 43 is larger than the slot width t of the slot 23, cogging torque resulting from the total amount of the magnetic attractive force acting on the rotational direction may be reduced. Torque ripple may also be reduced and therefore occurrence of back torque in the opposite rotational direction may be controlled.

Figure 7:
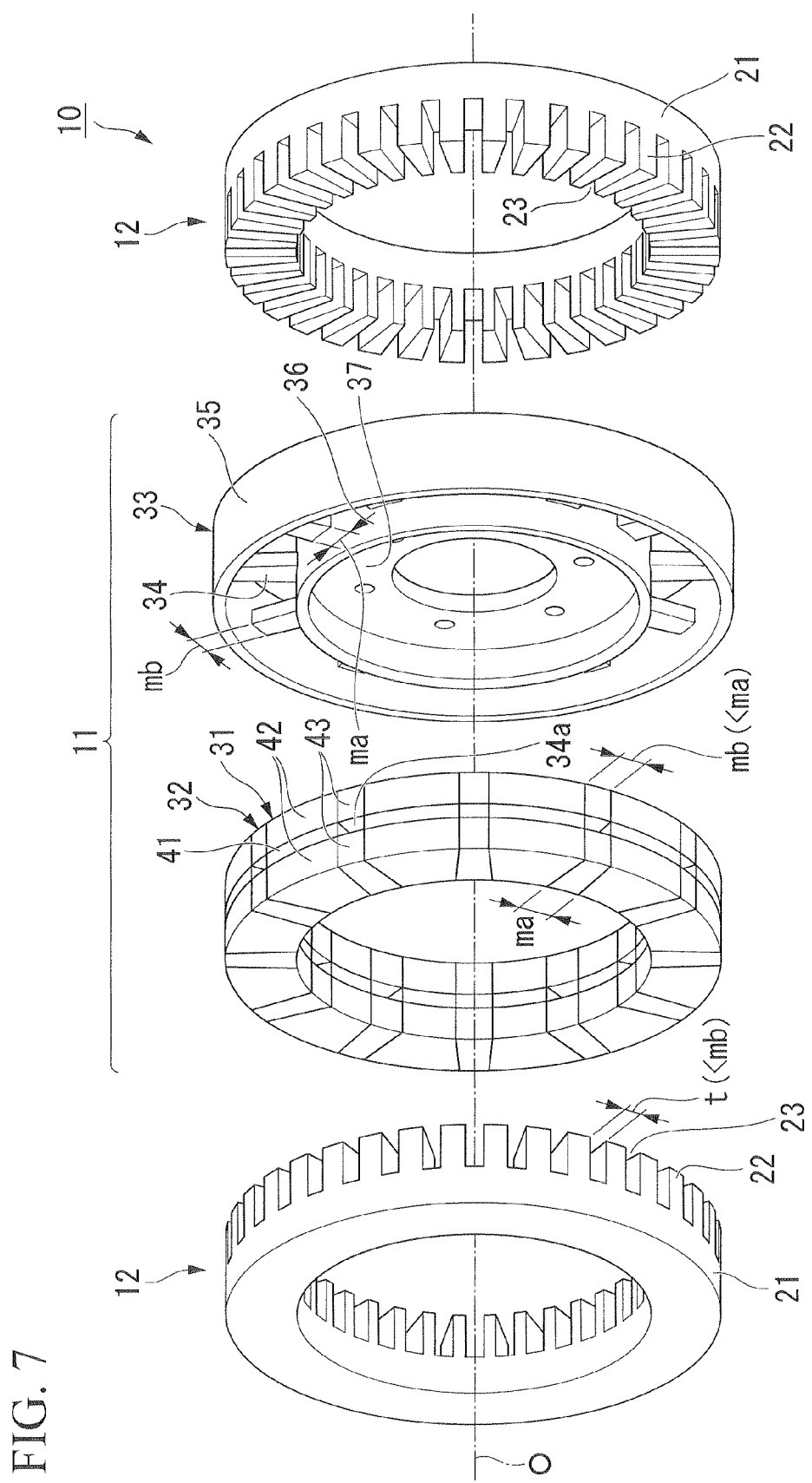
FIG. 7 is an exploded perspective view of a rotor of an axial gap motor according to a first modified embodiment.
Figure 8:
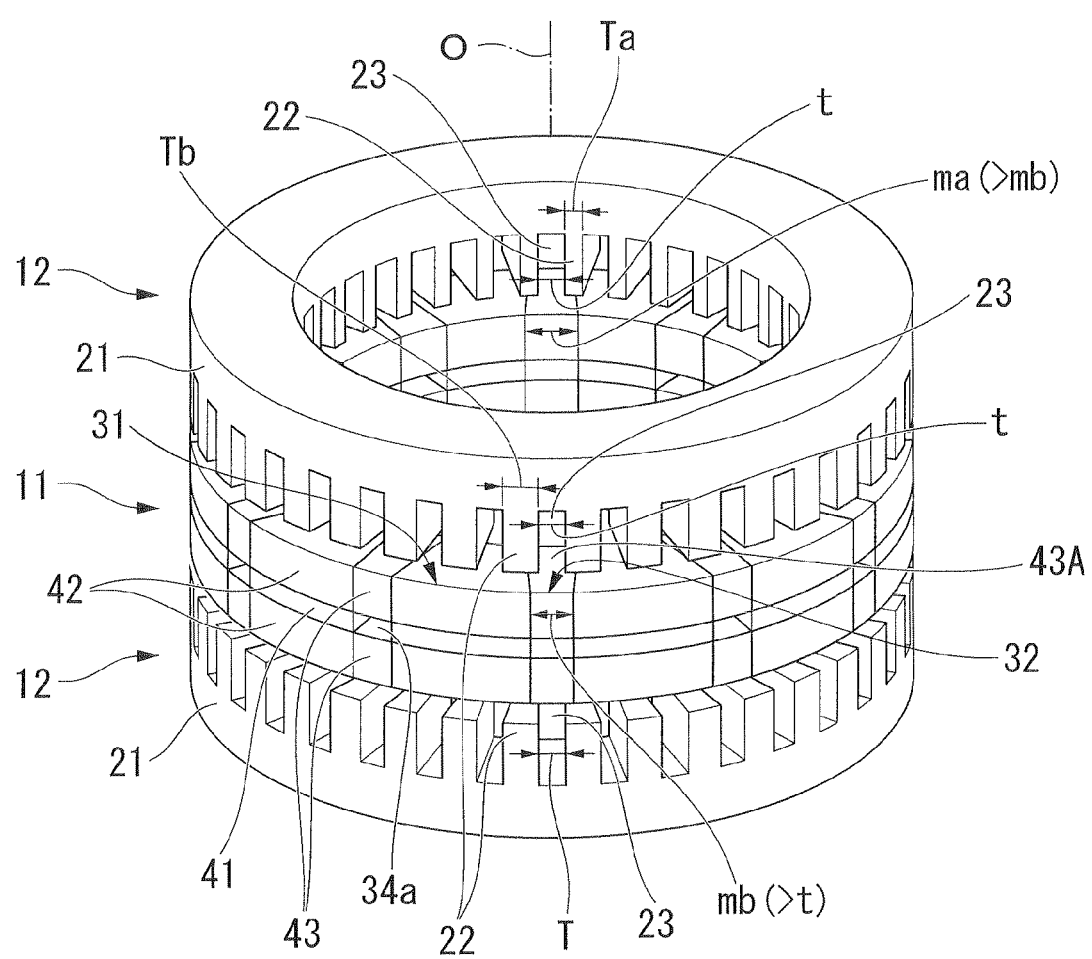
FIG. 8 is a perspective view of a main part of the rotor according to the first modified embodiment.
Figure 9:
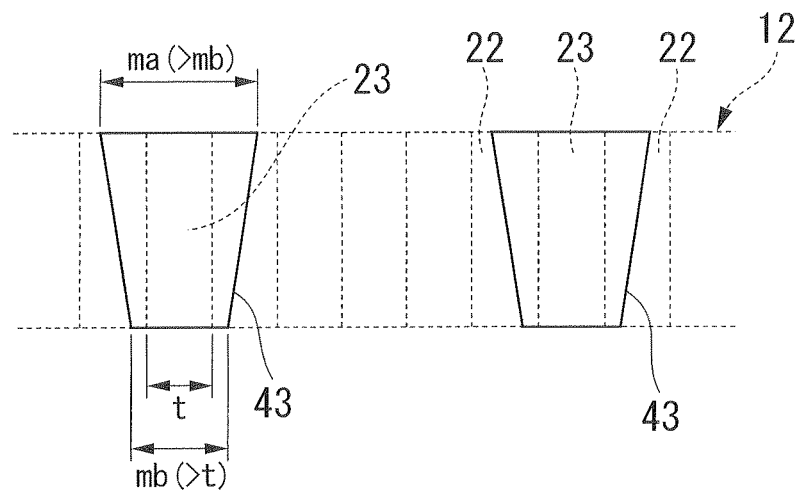
FIG. 9 illustrates an auxiliary permanent magnet part of the rotor of the axial gap motor according to the first modified embodiment seen from a direction of a rotational axis O.
Figure 10:
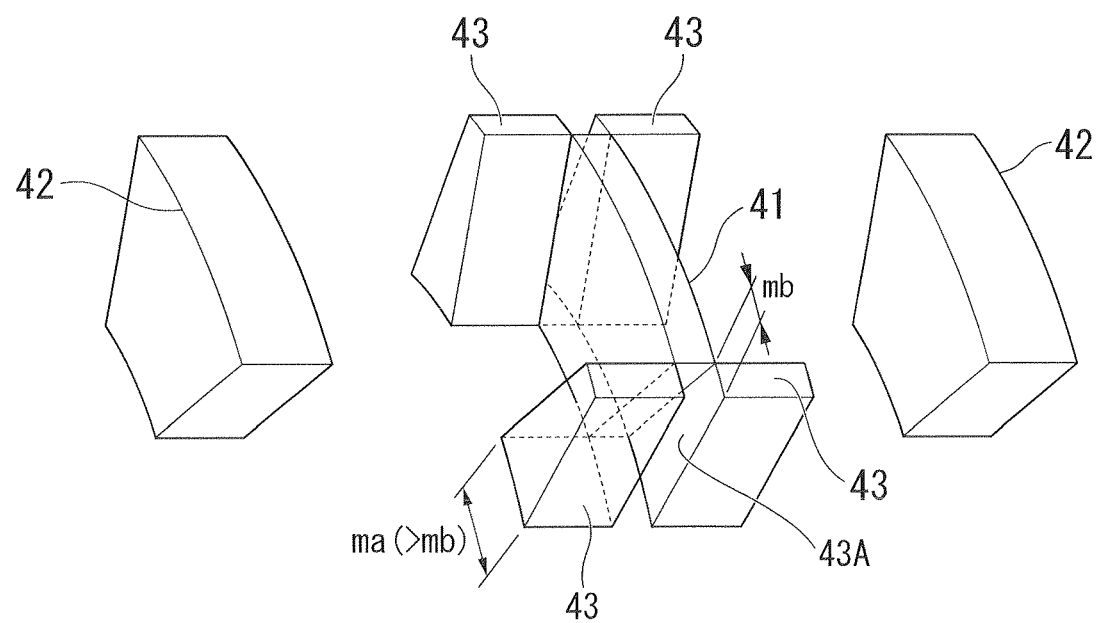
FIG. 10 is a perspective view of main parts of a main magnet pole and an auxiliary magnet portion of the axial gap motor according to the first modified embodiment.

FIG. 7 shows the rotor frame 33 of the rotor 11 and components other than the rotor frame 33 (i.e., the main magnet poles 31 and the auxiliary magnet portions 32) separately. FIG. 8 only shows the components other than the rotor frame 33 (i.e., the main magnet poles 31 and the auxiliary magnet portions 32). As shown in FIGS. 7 and 8, spaces 34a are defined between the pair of auxiliary permanent magnet parts 43 opposing along the rotational axis O and between the main permanent magnet parts 41 adjacent in the circumferential direction. The radial ribs 34 of the rotor frame 33 are disposed in the spaces 34a.

Although the main permanent magnet part 41 has a predetermined constant thickness along the rotational axis O in the radial direction as in the radial rib 34 in the first modified embodiment, the invention is not limited to the same. In a second modified embodiment shown in FIGS. 11 and 12, the main permanent magnet part 41 may alternatively have a thickness along the rotational axis O which increases, as in the radial rib 34, gradually from an outer end toward an inner end along the radial direction such that the inner circumferential thickness Wa is larger than the outer circumferential thickness Wb. The main permanent magnet part 41 may have a radial direction cross-section which increases from the outer end toward the inner end along the radial direction. With this configuration, an end surface of the main permanent magnet part 41 along the rotational axis O, i.e., a surface 41A opposite the stator, is inclined at a predetermined angle O.

In the second modified embodiment, the auxiliary permanent magnet part 43 has a predetermined constant thickness along the rotational axis O in the radial direction as in the magnetic material 42. The auxiliary permanent magnet parts 43 may have a circumferential width which increases gradually from an outer end toward an inner end along the radial direction such that the inner circumferential width ma is larger than the outer circumferential width mb (ma>mb). Accordingly, the auxiliary permanent magnet part 43 has a cross-section along the radial direction which increases from the outer end toward the inner end along the radial direction.

In the second modified embodiment, the width Za of the inner circumferential cylindrical member 35 of the rotor frame 33 along the rotational axis O is larger than the width Zb of the outer circumferential cylindrical member 36 along the rotational axis O. This is because the thickness of the radial rib 34 of the rotor frame 33 and the thickness of the main permanent magnet part 41 of each main magnet pole 31 along the rotational axis O increase gradually from the outer end toward the inner end along the radial direction such that the inner circumferential thickness Wa is larger than the outer circumferential thickness (Wa>Wb).

According to the axial gap motor 10 of the second modified embodiment, the main permanent magnet part 41 and the auxiliary permanent magnet part 43 have a radial direction cross-section which increases from the outer end toward the inner end along the radial direction. With this configuration, rigidity of the rotor 11 may further be increased and occurrence of resonance during high-speed rotation of the rotor 11 may be prevented to provide a stable rotation state. Since the outer circumferential width mb (<the inner circumferential width ma) of the auxiliary permanent magnet part 43 is larger than the slot width t of the slot 23, cogging torque resulting from the total amount of the magnetic attractive force acting on the rotational direction may be reduced. Torque ripple may also be reduced and therefore occurrence of back torque in the opposite rotational direction may be controlled.

Figure 11:
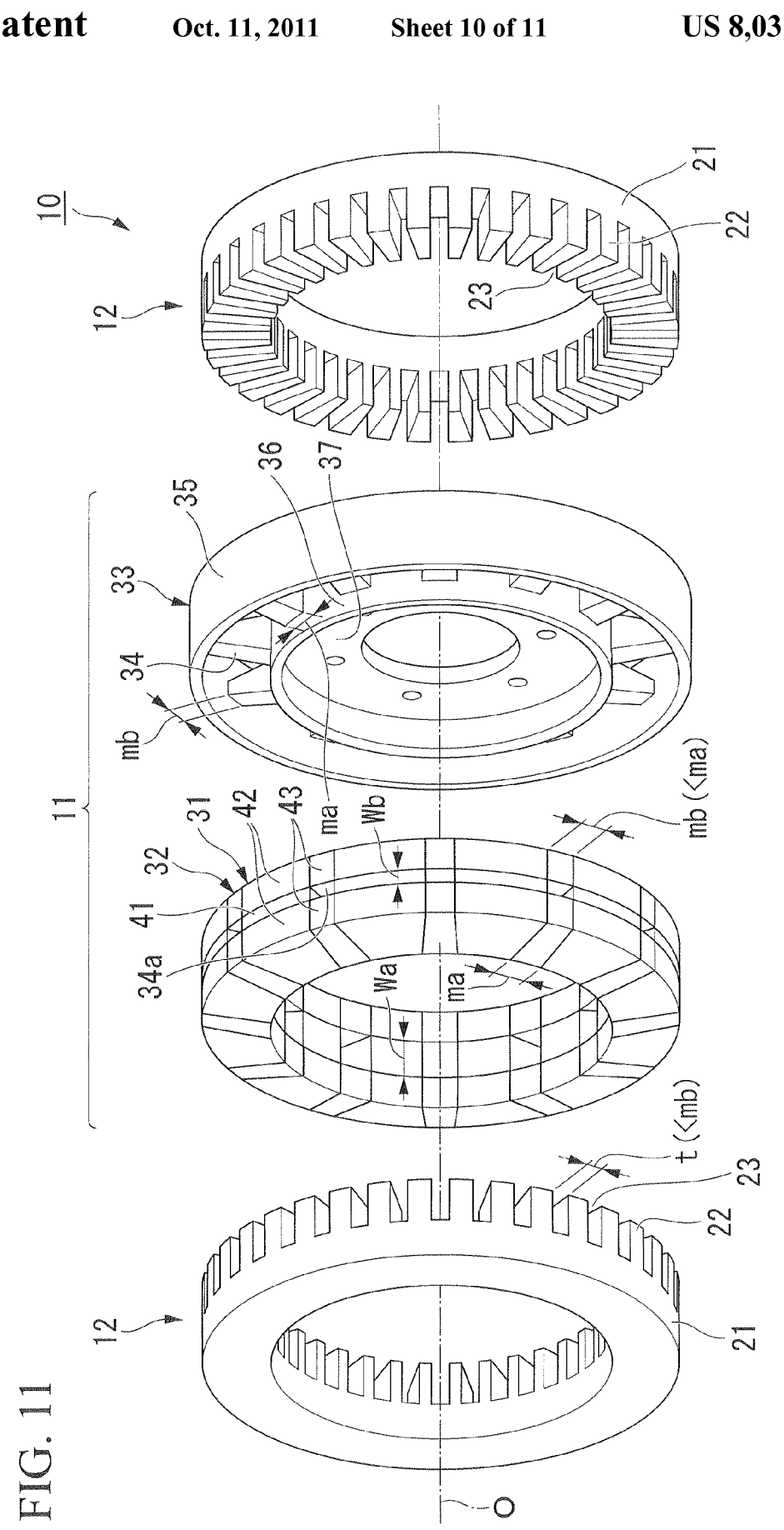
FIG. 11 is an exploded perspective view of a rotor of an axial gap motor according to a second modified embodiment.
Figure 12:
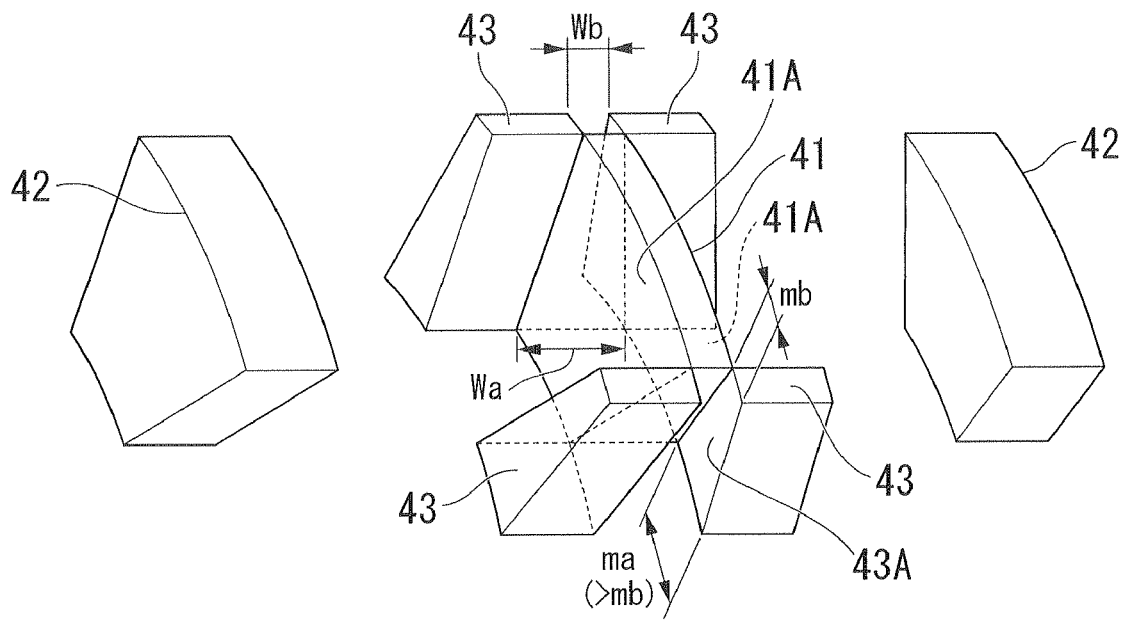
FIG. 12 is a perspective view of main parts of a main magnet pole and an auxiliary magnet portion of the axial gap motor according to the second modified embodiment.

FIG. 11 shows the rotor frame 33 of the rotor 11 and components other than the rotor frame 33 (i.e., the main magnet poles 31 and the auxiliary magnet portions 32) separately. As shown in FIG. 11, spaces 34a are defined between the pair of auxiliary permanent magnet parts 43 opposing along the rotational axis O and between the main permanent magnet parts 41 adjacent in the circumferential direction. The radial ribs 34 of the rotor frame 33 are disposed in the spaces 34a.

Although the main permanent magnet part 41 and the auxiliary permanent magnet part 43 have a radial direction cross-section which increases from the outer end toward the inner end along the radial direction in the second modified embodiment, the invention is not limited to the same. Alternatively, at least one of the main permanent magnet part 41 and the auxiliary permanent magnet part 43 may have a radial direction cross-section which increases from the outer end toward the inner end along the radial direction.

Figure 13:
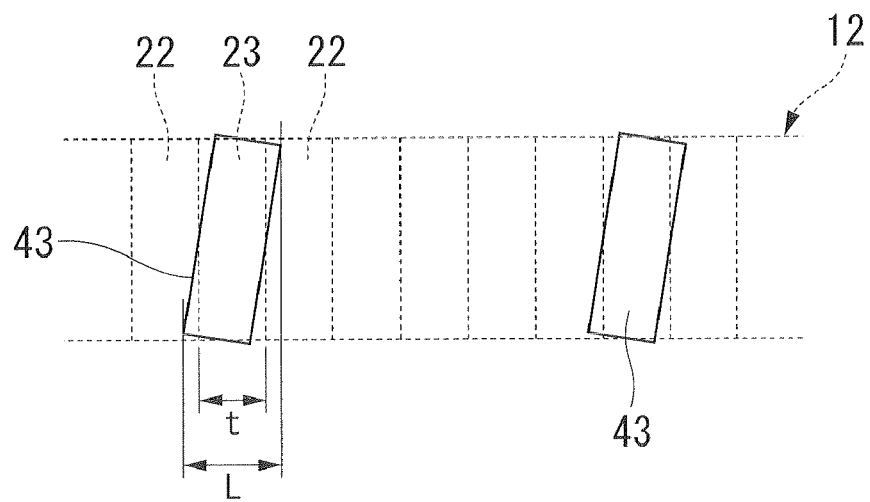
FIG. 13 illustrates an auxiliary permanent magnet part of the rotor of the axial gap motor according to a third modified embodiment seen from a direction of a rotational axis O.

Since the inner circumferential cylindrical member 35 and the outer circumferential cylindrical member 36 of the rotor frame 33 are connected by the radial ribs 34 extending in the radial direction in the above-described embodiment, the pair of auxiliary permanent magnet parts 43 which oppose each other with each radial rib 34 disposed therebetween along the rotational axis O are also disposed to extend in the radial direction (i.e., the longitudinal direction of the slot 23). The invention, however, is not limited to the same. Alternatively, each of the auxiliary permanent magnet parts 43 may be disposed to extend in a direction perpendicular to the longitudinal direction of the slot 23 as in a third modified embodiment shown in FIG. 13.

In the third modified embodiment, each of the auxiliary permanent magnet parts 43 may be inclined with respect to the teeth 22 of each stator 12. Each of the auxiliary permanent magnet parts 43 may be disposed such that a circumferential distance L between a first end (i.e., a circumferential direction first end) and a second end (i.e., a circumferential direction second end) along the rotational axis O is larger than the slot width t of the slot 23 and the first and the second ends may overlap different teeth 22.

Although the embodiments described above include a pair of stators 12 which oppose each other with the rotor 11 disposed therebetween along the rotational axis O, the invention is not limited to the same. Alternatively, only one of the stators 12 may be provided.

Although in the embodiments described above, the main magnet pole 31 includes a pair of magnetic materials 42 which oppose each other with the main permanent magnet part 41 disposed therebetween along the thickness direction and the auxiliary magnet portion 32 includes a pair of auxiliary permanent magnet parts 43 which are arranged with the radial rib 34 disposed therebetween along the rotational axis O, the invention is not limited to the same. Alternatively, the magnetic material 42 and the auxiliary permanent magnet part 43 may be disposed at one side along the rotational axis O.

In the embodiment described above, the magnetic material 42 may also include a penetrating section which may be a through-hole or a slit extending parallel to the direction of the rotational axis O. A magnetic path may be provided to penetrate the magnetic material 42 between the pair of stators 12. With this configuration, a desired magnetic direction may be provided to a current magnetic flux by the stator winding of each stator 12, which may increase the output torque. Further, rapid variation in magnetic resistance between the pair of stators 12 may be controlled and a waveform of the current magnetic flux may be shaped by the stator winding of the pair of stators 12. Accordingly, occurrence of torque ripple and a harmonic waveform in the current magnetic flux may be controlled and iron loss may be reduced.

According to the embodiments of the invention, a circumferential width between a first end (i.e., a circumferential direction first end) and a second end (i.e., a circumferential direction second end) on a surface opposite the stator is larger than a slot width of a slot defined between the teeth adjacent in the circumferential direction and thus the first and the second ends may overlap different teeth along the rotational axis. Accordingly, the circumferential direction first and second ends of each of the auxiliary permanent magnet parts receive magnetic attractive force that may be mutually canceled in the opposite directions. With this configuration, cogging torque resulting from the total amount of the magnetic attractive force acting on the rotational direction may be reduced. Torque ripple may also be reduced and therefore occurrence of back torque in the opposite rotational direction may be controlled.

What is claimed is:

1. An axial gap motor comprising:
    a rotor which is rotatable about a rotational axis; and
    a stator disposed at at least one side of the rotor along the rotational axis, wherein:
    the rotor includes a plurality of main permanent magnet parts and a plurality of auxiliary permanent magnet parts, the main permanent magnet parts being arranged on the rotor along a circumferential direction, a magnetizing direction of each of the main permanent magnet parts corresponding to the direction of the rotational axis, the auxiliary permanent magnet parts being disposed near an end portion of each of the main permanent magnet parts and a magnetizing direction of each of the auxiliary permanent magnet parts corresponding to a direction perpendicular to the direction of the rotational axis;
    the stator includes a plurality of teeth arranged in a circumferential direction and protruding toward the rotor along the rotational axis; and
    a circumferential distance between a circumferential direction first end and a circumferential direction second end of each of the auxiliary permanent magnet parts on a surface opposite the stator is larger than a slot width of a slot defined between the teeth adjacent in the circumferential direction.

2. An axial gap motor according to claim 1, wherein a circumferential width of the surface of each of the auxiliary permanent magnet parts opposite the stator is larger than the slot width of the slot.

3. An axial gap motor according to claim 1, wherein a longitudinal axis of each of the auxiliary permanent magnet parts when seen in a plan view along the rotational axis is orthogonal to a longitudinal axis of the slot defined between the teeth adjacent in the circumferential direction.

4. An axial gap motor according to claim 1, wherein:
    each of the auxiliary permanent magnet parts includes a first auxiliary permanent magnet part and a second auxiliary permanent magnet part, disposed near both ends of each of the main permanent magnet parts along the rotational axis; and
    the stator includes first and second stators which oppose each other along the rotational axis with the rotor disposed therebetween.

5. An axial gap motor according to claim 1, wherein each of the auxiliary permanent magnet parts has a cross-section along the radial direction of the rotor which increases from an outer end toward an inner end along the radial direction.

* * * * *